US005656690A

United States Patent [19]
Pradl et al.

[11] Patent Number: 5,656,690
[45] Date of Patent: Aug. 12, 1997

[54] ORGANOPOLYSILOXANE COMPOSITIONS WHICH CROSSLINK TO GIVE ELECTRICALLY CONDUCTIVE ELASTOMERS

[75] Inventors: Ferdinand Pradl; Peter Fink, both of Burghausen; Richard Birneder, Simbach; Katharina Noemmer, Mehring, all of Germany

[73] Assignee: Wacker-Chemie GmbH, Munich, Germany

[21] Appl. No.: 374,773

[22] PCT Filed: Aug. 12, 1993

[86] PCT No.: PCT/EP93/02153

§ 371 Date: Mar. 24, 1995

§ 102(e) Date: Mar. 24, 1995

[87] PCT Pub. No.: WO94/04608

PCT Pub. Date: Mar. 3, 1994

[30] Foreign Application Priority Data

Aug. 13, 1992 [DE] Germany .................. 42 26 841.9

[51] Int. Cl.$^6$ .................. C08K 3/00; H01B 1/06; B32B 9/04
[52] U.S. Cl. .................. 524/847; 524/862; 252/511; 428/368; 428/375; 428/391; 428/392; 428/447; 428/367
[58] Field of Search .................. 252/511; 524/862, 524/847; 428/368, 375, 391, 392, 447, 367

[56] References Cited

U.S. PATENT DOCUMENTS

| 2,476,166 | 7/1949 | Wayo .................. 260/399 |
| 3,445,420 | 5/1969 | Kookootsedes .................. 260/37 |
| 4,279,783 | 7/1981 | Kehrer et al. .................. 252/511 |
| 4,303,735 | 12/1981 | Kehrer et al. .................. 428/391 |

FOREIGN PATENT DOCUMENTS

| 0113277 | 7/1984 | European Pat. Off. . |
| 0173561 | 3/1986 | European Pat. Off. . |
| 2046348 | 11/1980 | United Kingdom . |
| WO 90/12842 | 11/1990 | WIPO . |

OTHER PUBLICATIONS

AN 84–172493/28, the English Derwent abstract.
AN 81–64801D, the English Derwent abstract.

Primary Examiner—Karen A. Dean
Attorney, Agent, or Firm—Martin Connaughton

[57] ABSTRACT

The invention relates to organopolysiloxane compositions that when crosslinked form electroconductive elastomers. The elastomers are formed via an addition crosslinking method and contain 11% to 30% by weight with respect to the total composition of carbon fibers having a 0.1 to 10 mm average length. The compositions are suitable for producing injection molded articles.

6 Claims, No Drawings

ORGANOPOLYSILOXANE COMPOSITIONS WHICH CROSSLINK TO GIVE ELECTRICALLY CONDUCTIVE ELASTOMERS

The invention relates to organopolysiloxane compositions which crosslink to give electrically conductive elastomers and their preparation. The invention furthermore relates to the production of shaped articles by injection molding.

U.S. Pat. No. 4,279,783 discloses organopolysiloxane compositions which crosslink to give electrically conductive elastomers and are obtained by mixing an organopolysiloxane mass which crosslinks to give an electrically conductive elastomer and comprises carbon black with 0.3 to 5.0% by weight, based on the total weight of the organopolysiloxane composition, of carbon fibers which have an average length of 1 to 6 mm.

There was the object of providing organopolysiloxane compositions which crosslink to give electrically conductive elastomers and can be prepared without co-using solvents, are free from cleavage products, can be pumped and can be used to obtain shaped articles by injection molding, and with which elastomers which have a lower specific resistance than electrically conductive organopolysiloxane elastomers known to date are obtained. The object is achieved by the invention.

The invention relates to organopolysiloxane compositions which crosslink to give electrically conductive elastomers and comprise an organopolysiloxane mass which crosslinks by addition to give an electrically non-conductive elastomer and (a) 11 to 30% by weight, based on the total weight of the organopolysiloxane composition, of carbon fibers having an average length of 0.1 to 10 mm.

The organopolysiloxane compositions according to the invention preferably have an average viscosity of $0.5 \times 10^6$ to $5 \times 10^6$ mPa.s at 25° C., preferably $1 \times 10^6$ to $3 \times 10^6$ mPa.s at 25° C.

The carbon fibers (a) used in the organopolysiloxane compositions according to the invention preferably have a length of 0.5 to 3 mm and a diameter of preferably 5 to 10 μm, preferably 6 to 8 μm, and are commercially obtainable. Carbon fibers are also to be understood as meaning graphite fibers.

All the organopolysiloxane masses known to date which crosslink by addition to give electrically non-conductive elastomers can be used as the organopolysiloxane masses which crosslink by addition to give electrically non-conductive elastomers. The organopolysiloxane masses which crosslink by addition to give electrically non-conductive elastomers preferably comprise, as essential constituents, (b) an organopolysiloxane containing SiC-bonded hydrocarbon radicals having aliphatic carbon-carbon multiple bonds, (c) an organopolysiloxane containing Si-bonded hydrogen atoms, (d) a catalyst, and if appropriate (e) an inhibitor.

Preferred organopolysiloxanes (b) are those of the general formula $$R_a^1 R_{3-a} SiO \, (R_2SiO)_n (R^1RSiO)_m R_{3-a} R_a^1,$$

in which the radicals R are identical or different monovalent hydrocarbon radicals which are free from aliphatic carbon-carbon multiple bonds and can optionally be halogenated, $R^1$ is a monovalent hydrocarbon radical having aliphatic carbon-carbon multiple bonds, a is 0 or 1, n is an integer and m is 0 or an integer, and in which the sum m+n is an integer having a value such that the average viscosity of these organopolysiloxanes is 100 to $10_6$ mPa.s, preferably 200 to 200,000 mPa.s, at 25° C., with the proviso that at least 2 radicals $R^1$ are present per molecule.

The radicals are R preferably contain 1 to 18 carbon atoms per radical. Examples of radicals R are alkyl radicals, such as the methyl, ethyl, n-propyl, iso-propyl, n-butyl, iso-butyl, tert.-butyl, n-pentyl, iso-pentyl, neo-pentyl and tert.-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals such as the n-nonyl radical; decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radical.

Examples of halogenated hydrocarbon radicals R are haloalkyl radicals such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Examples of radicals $R^1$ are alkenyl radicals, such as the vinyl, allyl, butenyl and hexenyl radical, the vinyl radical being preferred.

If an organopolysiloxane having Si-bonded vinyl groups is used as constituent (b), these organopolysiloxane preferably contain 0.03 to 1.1% by weight, preferably 0.05 to 0.7% by weight, of vinyl groups.

One type of constituent (b), but also a mixture of at least two different constituents (b), can be used.

Preferred organopolysiloxanes containing Si-bonded hydrogen atoms are linear, cyclic or branched organopolysiloxanes comprising units of the formula $$R_b H_c SiO_{\frac{4-b-c}{2}},$$

in which R has the meaning given above for this radical, b is 0, 1, 2 or 3, c is 0 or 1 and the sum of b+c is ≦3, with the proviso that at least 2, in particular at least 3, Si-bonded hydrogen atoms are present per molecule.

Particularly preferred organopolysiloxanes which contain S-bonded hydrogen atoms are those of the general formula $$H_d R_{3-d} SiO(R_2SiO)_x(HRSiO)_y R_{3-d} H_d,$$

in which R has the meaning given above for this radical, d is 0 or 1, x is 0 or an integer and y is 0 or an integer, and in which the sum x+y is an integer having a value such that the average viscosity of this organopolysiloxane is 1 to 1000 mPa.s at 25° C., in particular 300 to 500 mPa.s at 25° C., with the proviso that at least 2, in particular at least 3, Si-bonded hydrogen atoms are present per molecule.

Preferred examples of organopolysiloxanes (c) are copolymers of dimethylhydridosiloxane and dimethylsiloxane siloxane units, copolymers of dimethylhydridosiloxane, dimethylsiloxane and methylhydridosiloxane units, copolymers of trimethylsiloxane and methythydridosiloxane units and copolymers of trimethylsiloxane, dimethylsiloxane and methylhydridosiloxane units.

The organopolysiloxanes (c) preferably comprise 0.01 to 1.6% by weight, preferably 0.1 to 1% by weight, of Si-bonded hydrogen atoms.

One type of constituent (c), but also a mixture of at least two different types of constituent (c) can be used.

If an organopolysiloxane containing Si-bonded vinyl groups is used as the organopolysiloxane (b), the Si-bonded hydrogen is preferably present in amounts of 0.1 to 15 Si-bonded hydrogen atoms per Si-bonded vinyl radical.

The same catalysts which it has also been possible to employ to date for promoting the addition of Si-bonded hydrogen onto an aliphatic double bond can be employed as catalysts (d) which promote the addition of Si-bonded hydrogen onto an aliphatic double bond. Examples of such catalysts (d) are metallic and finely divided platinum, ruthenium, rhodium, palladium and iridium, it being possible for these metals in each case to be on solid carriers, such as silicon dioxide, aluminum oxide or active charcoal, and compounds and complexes of these elements, such as platinum halides, for example $PtCl_4$, $H_2PtCl_6*6H_2O$, $Na_2PtCl_4*4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6*6H_2O$ and cyclohexanone, platinum-vinylsiloxane complexes such as platinum-1,3-divinyl-1,1,3,3-tetramethyldisiloxane complexes with or without a content of detectable inorganically bonded halogen, bis(gamma-picoline)-platinum dichloride, trimethylenedipyridineplatinum dichloride, dicyclopentadieneplatinum dichloride, dimethyl sulfoxideethyleneplatinum (II) dichloride, cyclooctadiene-platinum dichloride, norbornadiene-platinum dichloride, gamma-picoline-platinumdichloride, cyclopentadiene-platinum-dichloride, reaction products of platinum tetrachloride with an olefin and primary amine or secondary amine or primary and secondary amine according to U.S. Pat. No. 4,292,434, such as the reaction product of platinum tetrachloride dissolved in 1-octene with sec-butylamine, ammonium-platinum complexes according to EP-B 110 370 and platinum compounds and complexes according to U.S. Pat. No. 4,177,341.

If platinum or a platinum compound or platinum complex is employed as catalyst (d), such a catalyst is preferably used in amounts of 5 to 50 ppm by weight (parts by weight per million parts by weight), in each case calculated as elemental platinum and based on the total weight of constituents (b) and (c).

One type of catalyst (d), but also a mixture of at least two different types of such catalysts (d), can be used.

All the inhibitors which it has also been possible to use to date for the same purpose can also be used as inhibitors (e), i.e. agents which delay or regulate the crosslinking, with the organopolysiloxane masses which crosslink by addition to give electrically non-conductive elastomers. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point at least 25° C. under 1012 mbar (absolute) and at least one aliphatic triple bond according to U.S. Pat. No. 3,445,420, such as 1-ethynyicyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, inhibitors according to U.S. Pat. No. 2,476,166, such as a mixture of diallyl maleate and vinyl acetate, and inhibitors according to U.S. Pat. No. 4,504,645 such as maleic acid monoesters.

The inhibitor (e) is preferably employed in amounts of 0.01 to 0.2% by weight based on the total weight of constituents (b) and (c).

In addition to constituents (b), (c), (d) and if appropriate (e), the organopolysiloxane masses which crosslink by addition to give electrically non-conductive elastomers can be used together with substances which may have been present in the organopolysiloxane masses known to date which crosslink by addition to give electrically non-conductive elastomers. Examples of such other substances are fillers having a BET surface area of an least 50 $m^2/g$, such as pyrogenically produced silicon dioxide or precipitated silicon dioxide having a BET surface area of at least 50 $m^2/g$, fillers having a BET surface area of less than 50 $m^2/g$, such as quartz flour, glass fibers, precipitated silicon dioxide having a BET surface area of less than 50 $m^2/g$ or diatomaceous earth, pigments, soluble dyestuffs, plasticizers, organopolysiloxane resins, purely organic resins, such as polyvinyl chloride powders, and agents for improving the adhesion of the elastomers to the substrates on which they have been produced.

The abovementioned fillers can be hydrophobized, for example by treatment with organosilanes, organosiloxanes or disilazanes, such as hexamethyldisilazane.

The organopolysiloxane compositions according to the invention which crosslink to rive electrically conductive elastomers are prepared by mixing constituents (a) to (e) by processes customary for the preparation of organopolysiloxane compositions which crosslink by addition. The organopolysiloxane compositions according to the invention are preferably prepared from more than one component, preferably from two components. The first component comprises in this case constituents (b) and (d), and the second component comprises constituent (c), or constituent (d) is present in a third component. Constituent (a) is preferably present in the first and second component, preferably in equal proportions. Constituent (e) is preferably present in the first component.

The crosslinking of the organopolysiloxane compositions according to the invention is preferably carried out at 15° C. to 250° C., preferably at 80° C. to 200° C.

The electrically conductive elastomers obtained from the organopolysiloxane compositions according to the invention preferably have a specific resistance of less than 1 Ohm×cm.

Shaped articles are produced from the organopolysiloxane compositions according to the invention by injection molding, compression molding, transfer compression molding or injection stamping, injection molding being preferred.

The process for the production of shaped articles by injection molding can be carried out shot-wise, semi-continuously or completely continuously.

Shaped articles produced by injection molding are preferred. Examples of such shaped articles are cable looms for ignition cables in motor vehicles and dots in telephone, computer and remote control contact mats or electrodes.

The organopolysiloxane compositions according to the invention furthermore can be used for the production of cable end seals, connectors or protective coatings for shielding from electromagnetic interference radiation.

In the examples which follow, all the parts and percentages data relates to the weight, unless stated otherwise.

EXAMPLES 1 to 3 a) A base mixture was in each case prepared by mixing 34.6 parts of a dimethylpolysiloxane containing vinyldimethylsiloxy groups as terminal units and having a viscosity of 20,000 mPa.s at 25° C., 8.6 parts of a dimethylpolysiloxane containing vinyldimethylsiloxy groups as terminal units and having a viscosity of 1000 mPa.s at 25° C., 10.4 parts of a pyrogenically produced silicic acid hydrophobized by treatment with hexamethyldisilazane and having a BET surface area of 300 m²/g and in each case 16.7, 19.0 and 23.0 parts of carbon fibers having an average length of 1 mm with one another.

b) A component A was in each case obtained by mixing in each case 100 parts of the base mixture described above under a) with 0.5 part of a platinum-1,1,3,3-tetramethyl-1,3-divinylsiloxane complex, 0.85 part of a diorganopolysiloxane of dimethylsiloxane units and 20 mol% of vinylmethylsiloxane units which contains vinyldimethylsiloxy groups as terminal units and has a viscosity of 600 mPa.s at 25° C., and 0.1 part of ethinylcyclohexanol.

c) A component B was in each case obtained by mixing in each case 100 parts of the base mixture described above under a) with 8 parts of a copolymer of di-methylsiloxane, methylhydridosiloxane and trimethylsiloxane units having a viscosity of 400 mPa.s at 25° C., which contains 0.45% by weight of Si-bonded hydrogen.

d) Component A and component B were then mixed with one another in each case in a weight ratio of 1:1. In each case sheets having a thickness of 2 mm were produced from this mixture by vulcanization at 150° C., and the specific volume resistance in each case was measured on these. The results are summarized in the table.

Comparison Experiment 1

The procedure of Example 1 was repeated, with the modification that 17.1 parts of carbon black were employed instead of 16.7 parts of carbon fibers in the base mixture. Components A and B were prepared as described in Example 1 and mixed with one another in a weight ratio of 1:1. The vulcanization and determination of the specific volume resistance were carried out as described in Example 1. The results are summarized in the table.

Comparison Experiment 2 to 4

(U.S. Pat. No. 4,279,783)

The procedure of Example 1 was repeated, with the modification that 17.1 parts of carbon black and in each case 0.5, 2.0 and 5.0 parts of carbon fibers were employed instead of 16.7 parts of carbon fibers in the base mixture. Components A and B were prepared as described in Example 1 and mixed with one another in a weight ratio of 1:1. The vulcanization and determination of the specific volume resistance were carried out as described in Example 1. The results are summarized in the table.

Comparison Experiment 5 and 6

The procedure of Example 1 was repeated, with the modification that in addition to the 16.7 parts of carbon fibers, in each case 5 and 10 parts of carbon black were employed in the base mixture. Components A and B were prepared as described in Example 1 and mixed with one another in a weight ratio of 1:1. The vulcanization and determination of the specific volume resistance were carried out as described in Example 1. The results are summarized in the table.

TABLE

| Example or comparison experiment | Carbon black* (%) | Carbon fiber* (%) | Specific volume resistance (Ohm × cm) |
|---|---|---|---|
| B1 | — | 16.7 | 0.5 |
| B2 | — | 19.0 | 0.5 |
| B3 | — | 23.0 | 0.5 |
| V1 | 17.1 | — | 12.1 |
| V2 | 17.1 | 0.5 | 9.9 |
| V3 | 17.1 | 2.0 | 6.3 |
| V4 | 17.1 | 5.0 | 4.1 |
| V5 | 5.0 | 16.7 | 9.7 |
| V6 | 10.0 | 16.7 | 121.0 |

*based on the total weight of the organopolysiloxane composition

EXAMPLE 4

For processing by injection molding, in each case components A and B from Examples 1 to 3 were packed into suitable vessels, introduced into a commercially available two-component metering machine and fed to the injection molding machine via a hose line system with the aid of hydraulic pressure and the integrated pumps. Intimate mixing of the two components, which took place initially in the mixing chamber and then in the static mixer, was very important here. The injection molding machine contained a mold, for shaping and vulcanization of the mixed rubber mass, which is constructed in accordance with the prior art and, where appropriate, also allows fully automatic operation, and a mold release aid. Conductive looms of cable for ignition cable in motor vehicles and conductive dots for telephone, computer and remote control contact mats could be produced.

We claim:

1. An organopolysiloxane composition having a viscosity of $0.5 \times 10^6$ to $5 \times 10^6$ mPa.s which crosslinks to give an electrically conductive elastomer consisting essentially of; (a) an electrically non-conductive addition curable organopolysiloxane mass and (b) 11% to 30% by weight, based on the total weight of the organopolysiloxane composition, of carbon fibers having an average length of 0.1 to 10 mm.

2. An organopolysiloxane composition as claimed in claim 1, wherein the electrically non-conductive, addition curable organopolysiloxane mass consists essentially of;
   i. an organopolysiloxane containing Si-carbon bonded hydrocarbon radicals having aliphatic carbon-carbon multiple bonds,
   ii. an organopolysiloxane containing Si-bonded hydrogen atoms,
   iii. a catalyst, and optionally
   iv. an inhibitor.

3. An organopolysiloxane composition as claimed in claim 2, in which organopolysiloxane (b) is an organopolysiloxane containing Si-bonded vinyl groups.

4. A process for the preparation of an organopolysiloxane composition, as claimed in claim 2, which comprises mixing constituents i–iv with from 11% to 30% by weight, based on the total weight of the organopolysiloxane composition, of carbon fibers having an average length of 0.1 to 10 mm.

5. A process for the production of a shaped article by injection molding an organopolysiloxane composition, which comprises employing an organopolysiloxane composition as claimed in claim 2.

6. A shaped article obtainable by the process as claimed in claim 5.

* * * * *